US007503164B2

(12) United States Patent
McMillan

(10) Patent No.: US 7,503,164 B2
(45) Date of Patent: Mar. 17, 2009

(54) DUCTED FAN WITH CONTAINMENT STRUCTURE

(75) Inventor: Alison J. McMillan, Derby (GB)

(73) Assignee: Rolls-Royce, PLC, London (GB)

( * ) Notice: Subject to any disclaimer, the term of this patent is extended or adjusted under 35 U.S.C. 154(b) by 646 days.

(21) Appl. No.: 11/153,616

(22) Filed: Jun. 16, 2005

(65) Prior Publication Data

US 2006/0034682 A1 Feb. 16, 2006

(30) Foreign Application Priority Data

Jul. 14, 2004 (GB) ................................ 0415707.9

(51) Int. Cl.
*F02K 3/02* (2006.01)
*F02K 1/00* (2006.01)

(52) U.S. Cl. ...................................... 60/226.1; 181/213

(58) Field of Classification Search ................ 60/226.1; 244/53 B, 1 N, 134 R; 181/210–214; 415/173.1, 415/173.3, 173.4

See application file for complete search history.

(56) References Cited

U.S. PATENT DOCUMENTS 3,566,606 A * 3/1971 Mortlock .................. 60/226.1
5,437,538 A 8/1995 Mitchell
5,628,622 A * 5/1997 Thore et al. ............. 416/241 R
5,941,685 A * 8/1999 Bagepalli et al. ......... 415/173.3
5,961,280 A * 10/1999 Turnquist et al. ........ 415/173.3
6,217,277 B1 * 4/2001 Liu et al. ....................... 415/9
6,251,494 B1 * 6/2001 Schreiber .................... 428/116
6,575,694 B1 6/2003 Thompson et al.
6,808,179 B1 * 10/2004 Bhattacharyya et al. ..... 277/348

FOREIGN PATENT DOCUMENTS

DE 102 44 038 A1 4/2004
JP A 2003-307274 10/2003
WO WO 2004/022927 A1 3/2004

* cited by examiner

*Primary Examiner*—Michael Cuff
*Assistant Examiner*—Gerald L Sung
(74) *Attorney, Agent, or Firm*—Oliff & Berridge, PLC

(57) ABSTRACT

The ducted fan (12) of a ducted fan gas turbine engine (10) is surrounded by a compartment (26), which is packed with bristles (38). Should a blade of the fan stage (12) disintegrate during operation of engine (10), the resulting fragments, if they pass through an abradeable honeycomb structure (32), will collide with the bristles (38), which will absorb the energy exerted by the fragments, and thus prevent puncturing of the outer wall (18) of the fan duct structure.

15 Claims, 2 Drawing Sheets

3
36
34
32
38
26
24
22
20
28
30
3
12

DUCTED FAN WITH CONTAINMENT STRUCTURE

BACKGROUND

The present invention relates to a fan duct having containment structure for preventing penetration of the duct walls by a fan blade or parts thereof that has or have broken free from associated rotary fan driving means within the duct.

It is known to construct fan duct containment liners from materials that provide a solid or near solid structure. For example, moulded plastics, or fibrous material that is impregnated with a bonding substance, which when cured, form a solid or near solid mass of appropriate shape. The use of crushable metal lattice structures are also known, which, on being struck and deformed by a freed blade or a part thereof, absorb the kinetic energy expended by the blade.

All of the known structures have a common drawback, in that in order to ensure achievement of containment of a broken blade, the structures must have sufficient thickness which generates weight. Depending on the field of application, this might not have undue significance. However, when the field of application is in the aero engine industry, e.g. where the ducted fan is of the kind fitted to an aircraft, weight has great significance.

SUMMARY

The present invention seeks to provide a ducted fan having an improved fan blade containment structure.

According to the present invention a ducted fan comprises a cowl having nested concentric walls, the inner one of which has structure that with said inner wall defines an annular compartment surrounding a stage of fan blades, wherein said compartment extends downstream of said blades and is packed with elongate bristles which lie with their lengths in directions that have at least a radial component relative to the axis of rotation of said fan blade stage.

The invention will now be described, by way of example and with reference to the accompanying drawings, in which:

DETAILED DESCRIPTION

Figure 1:
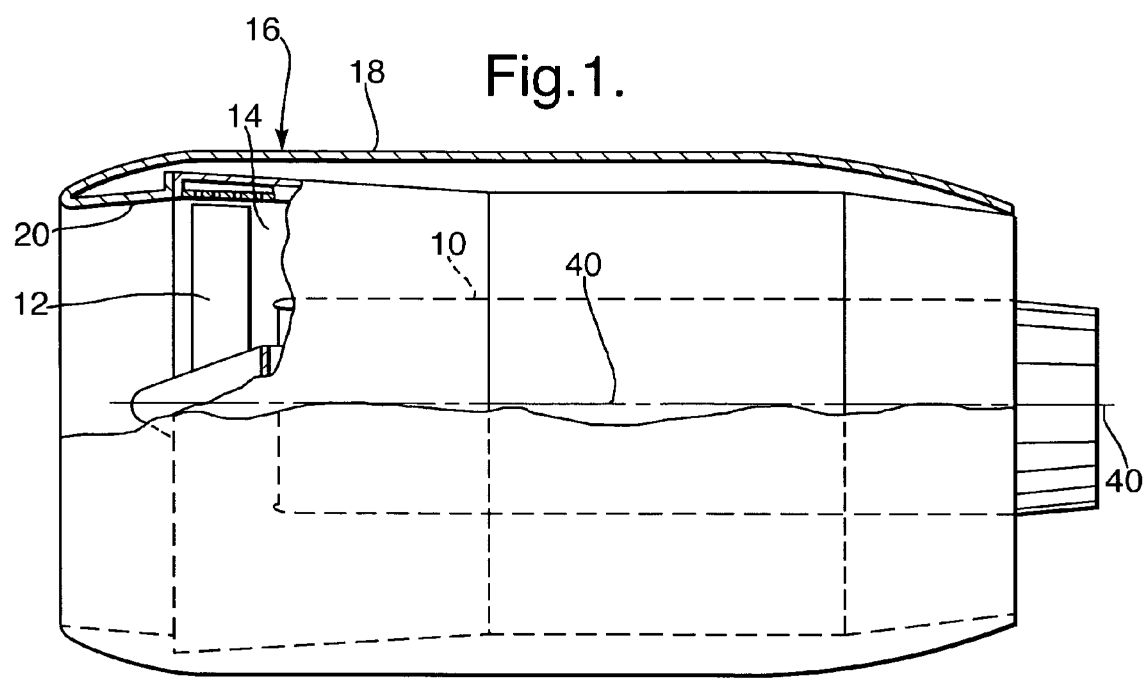
FIG. 1 is a diagrammatic part cross sectional view of a gas turbine engine having a ducted fan in accordance with the present invention.

Referring to FIG. 1. A gas turbine engine 10 is connected via shafts (not shown) in known manner, to drive a fan stage 12. Fan stage 12 lies in a duct 14 defined by a casing 16 having an outer wall 18 and a multiple part inner wall 20.

Figure 2:
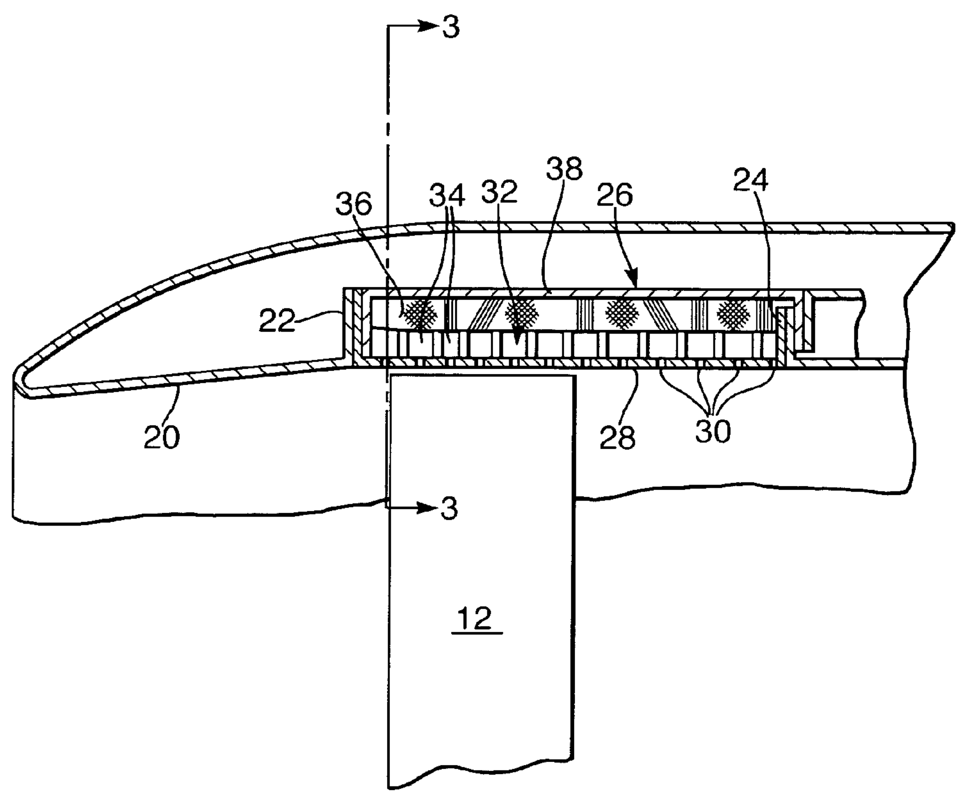
FIG. 2 is an enlarged view of the cross sectional part of FIG. 1.

Referring now to FIG. 2. Inner wall 20 has flanges 22 and 24, between which an annular box structure 26 is fixed. Box structure 26 surrounds fan stage 12 and extends beyond fan stage 12 in a downstream direction having regard to the direction of gas flow through engine 10 during operation.

In the present example, box structure 26 has a thin inner metal skin 28 through which a multitude of small holes 30 extend. Skin 28 is backed by a honeycomb structure 32 defined by chambers 34, which are typically hexagonal, rhombus or other shapes in known manner. Honeycomb structure 32 is itself surrounded by a dense mass of bristles 36, which in turn, are retained by a cylindrical metal structure 38. The purpose of the honeycomb is to form Helmholz resonators to absorb fan noise.

Figure 3:
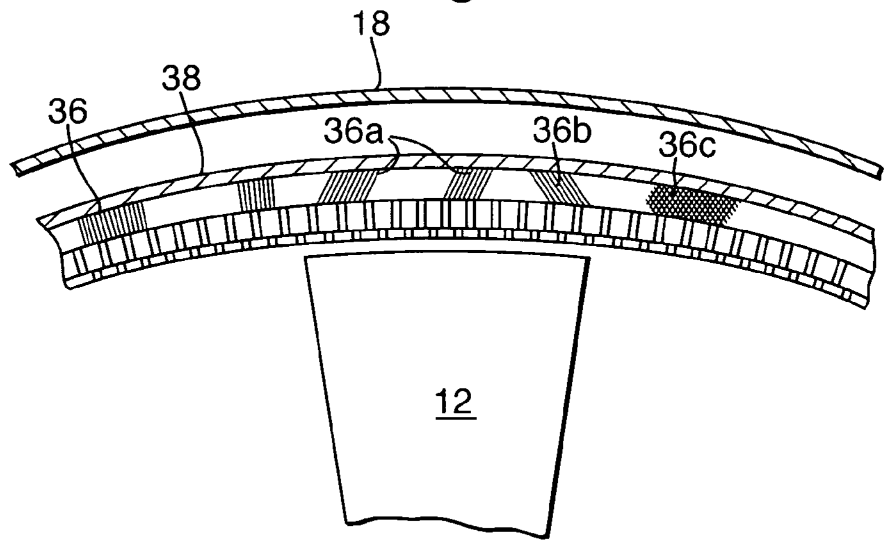
FIG. 3 is a cross sectional view on line 3-3 in FIG. 2.

Bunches of bristles 36 are shown, the intention being to indicate that they can be arrayed around honeycomb structure 32 in any one of the attitudes illustrated, which is more clearly seen in FIG. 3, reference to which is now made.

Referring to FIG. 3. Bristles 36 may be arrayed with their lengths radially aligned with the axis 40 of engine 10 (FIG. 1), or at some common angle thereto, as is indicated by numerals 36*a* and 36*b*, or in crossed over manner as shown at 36*c*. The crossing over can be arranged in a plurality of planes. Bristles 36 are bonded to metal structure 38 via their radially outer ends. Thus the bristles 36 may be angled in a direction having a circumferential component relative to the axis 40 and/or may be angled in a direction having an axial component relative to the axis 40.

Figure 4:
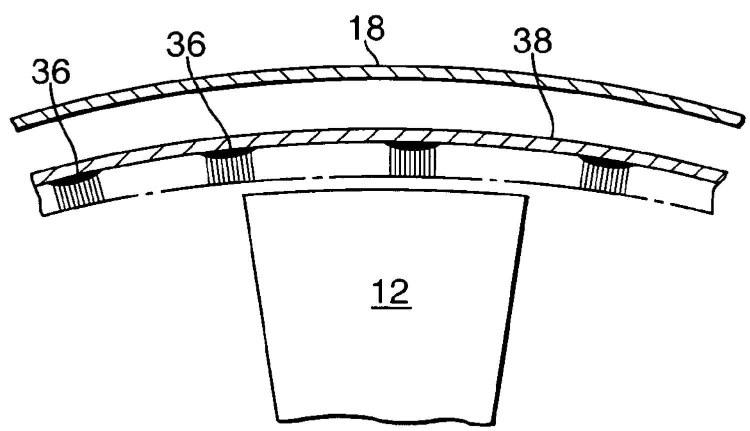
FIG. 4 is a cross sectional view on a line corresponding to line 3-3 in FIG. 2 but showing an alternative arrangement.

Referring to FIG. 4. In this alternative arrangement of the present invention, the honeycomb structure 32 of FIGS. 2 and 3 has been obviated, thus reducing weight, and bristles 36, only a few of which are shown, extend from structure 38 towards the tips of the stage of fan blades 12. The radially inner ends of bristles 36 thus form a substitute part of inner wall 20, and further, act as a fan blade noise absorbing structure during normal operation of engine 10. The bristles may be of varying lengths such that the sculptured texture of the bristle ends form Helmholz resonators in the same way as the deleted honeycomb.

Figure 5:
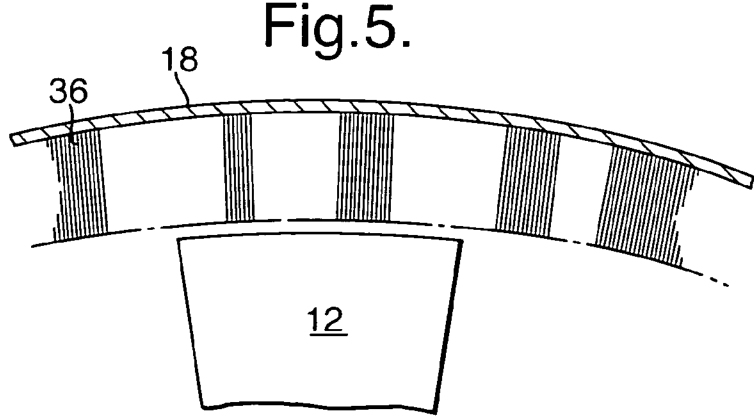
FIG. 5 is an enlarged view corresponding to the cross sectional part of FIG. 1 but showing an alternative arrangement.

Referring now to FIG. 5. In this further alternative arrangement of the present invention, cylindrical structure 38 has been obviated, thus further reducing weight, and bristles 36 are bonded to the inner surface of wall 18 via their radially outer ends. The radially inner ends of bristles 36 also extend radially inwards, so as to form a substitute part of inner wall 20.

In a situation where a fan blade disintegrates during operation of associated engine 10, the broken pieces will impact the adjacent ends of some bristles 36. The impact energy generated will be absorbed by the friction generated between struck bristles 36 and the blade pieces, by friction generated between the struck bristles 36 and those bristles 36 adjacent to them, resistance of the bristles 36 to deformation, and to slicing of the impactor through bristles 36.

The material from which the bristles 36 are made, should have a high coefficient of friction with itself and with the material from which the stage of fan blades 12 is made. In the present example the fan stage 12 is manufactured in titanium. The material should also have a high strain to failure, allowing large material deformation.

Bristles 36 may be curved so that they grip each other or may have surface texturing in order to increase friction. They may have high friction coatings applied.

I claim:

1. A ducted fan of a turbine engine comprising:

a casing having an outer wall and a concentric inner wall, the casing having a fan blade containment structure that with said inner wall defines an annular compartment surrounding a stage of fan blades, the stage of fan blades extending in a radial direction from an axis of rotation wherein said annular compartment extends downstream of said fan blades, said annular compartment containing a plurality of elongate bristles having lengths, the bristles being arranged to lie with their lengths in directions that have at least a radial component relative to the axis of rotation of said stage of fan blades, and the bristles being spaced radially away from the fan blades, such that the bristles are not in contact with the fan blades and the bristles do not extend beyond the containment structure.

2. A ducted fan comprising a casing as claimed in claim 1 wherein said bristles are arranged in a truly radial manner with respect to the axis of rotation of said stage of fan blades.

3. A ducted fan comprising a casing as claimed in claim 1 wherein said bristles are angled in a direction having a circumferential component relative to said compartment.

4. A ducted fan comprising a casing as claimed in claim 1 wherein said bristles are angled in a direction having an axial component relative to said component.

5. A ducted fan comprising a casing as claimed in claim 1 wherein said bristles are angled so as to cross each other in at least one plane.

6. A ducted fan comprising a casing as claimed in claim 5 wherein said plane is the plane of rotation of said stage of fan blades.

7. A ducted fan comprising a casing as claimed in claim 5 wherein said plane is the plane containing the axis of rotation of said stage of fan blades.

8. A ducted fan comprising a casing as claimed in claim 1 wherein said bristles have high friction coating or surface texturing.

9. A ducted fan comprising a casing as claimed in claim 1 wherein said bristles are curved.

10. A ducted fan comprising a casing as claimed in claim 1 wherein said bristles are bonded to an inner surface of said compartment.

11. A ducted fan comprising a casing as claimed in claim 10 wherein said inner surface is the inner surface of a radially outer wall of said compartment.

12. A ducted fan comprising a casing as claimed in claim 1 wherein the annular compartment is defined by an annular box structure, the annular box structure sequentially comprises in a radial direction from the fan blade to the outer wall of the casing, an inner metal skin, a honeycomb structure, the bristles and a cylindrical metal structure.

13. A ducted fan comprising a casing as claimed in claim 1 wherein the annular compartment is defined by an annular box structure, the annular box structure comprises a cylindrical metal structure surrounding said bristles.

14. A ducted fan comprising a casing as claimed in claim 12 wherein the annular box structure is secured to the inner wall of the casing.

15. A ducted fan comprising a casing as claimed in claim 13 wherein the annular box structure is secured to the inner wall of the casing.

* * * * *